United States Patent
Ijuin

(10) Patent No.: US 8,537,390 B2
(45) Date of Patent: Sep. 17, 2013

(54) COMMUNICATION DEVICE AND RECORDING MEDIUM STORING PROGRAM THEREFOR

(75) Inventor: Keisuke Ijuin, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 692 days.

(21) Appl. No.: 12/727,539

(22) Filed: Mar. 19, 2010

(65) Prior Publication Data

US 2010/0245934 A1    Sep. 30, 2010

(30) Foreign Application Priority Data

Mar. 27, 2009  (JP) ................... 2009-080073

(51) Int. Cl.
*G06F 3/12* (2006.01)

(52) U.S. Cl.
USPC .................... 358/1.15; 358/1.14; 358/1.18

(58) Field of Classification Search
USPC ....................................... 358/1.15
See application file for complete search history.

(56) References Cited

U.S. PATENT DOCUMENTS

| | | | | |
|---|---|---|---|---|
| 7,706,010 B2* | 4/2010 | Ko et al. | | 358/1.15 |
| 8,014,011 B2* | 9/2011 | Kim | | 358/1.15 |
| 8,150,819 B2* | 4/2012 | Takahashi | | 707/705 |
| 8,223,372 B2* | 7/2012 | Kunioka et al. | | 358/1.15 |
| 8,305,596 B2* | 11/2012 | Hamada | | 358/1.14 |
| 2002/0041394 A1* | 4/2002 | Aoki | | 358/1.15 |
| 2003/0035144 A1* | 2/2003 | Shima | | 358/1.18 |
| 2003/0182367 A1* | 9/2003 | Ohara | | 709/203 |
| 2006/0061803 A1* | 3/2006 | Oka | | 358/1.15 |
| 2007/0171821 A1* | 7/2007 | Matoba | | 370/229 |
| 2009/0268229 A1* | 10/2009 | Richardson et al. | | 358/1.15 |
| 2010/0030707 A1* | 2/2010 | Jingu | | 705/400 |
| 2012/0008160 A1* | 1/2012 | Matsushita | | 358/1.14 |

FOREIGN PATENT DOCUMENTS

| | | |
|---|---|---|
| JP | 2001-166900 A | 6/2001 |
| JP | 2006-184980 A | 7/2006 |
| JP | 2007-179328 A | 7/2007 |

* cited by examiner

*Primary Examiner* — Dung Tran
(74) *Attorney, Agent, or Firm* — Baker Botts L.L.P.

(57) ABSTRACT

A communication device having a communication unit configured to communicate with a contents storage storing contents information and location information in associated manner, and to communicate with an external device. The communication device obtains the location information from the contents storage, modifies the location information to access information causing an access to the communication device, and transmits the same to the external device. An identifying unit identifies the location information corresponding to the access information if it is selected in the external device and second access to the communication device is made, in response to the selection of the access information through the communication unit. A contents obtaining unit obtains contents information directed by the location information identified by the identifying unit, through the communication unit, and an execution unit generates the contents based on the contents information and outputs the same.

7 Claims, 8 Drawing Sheets

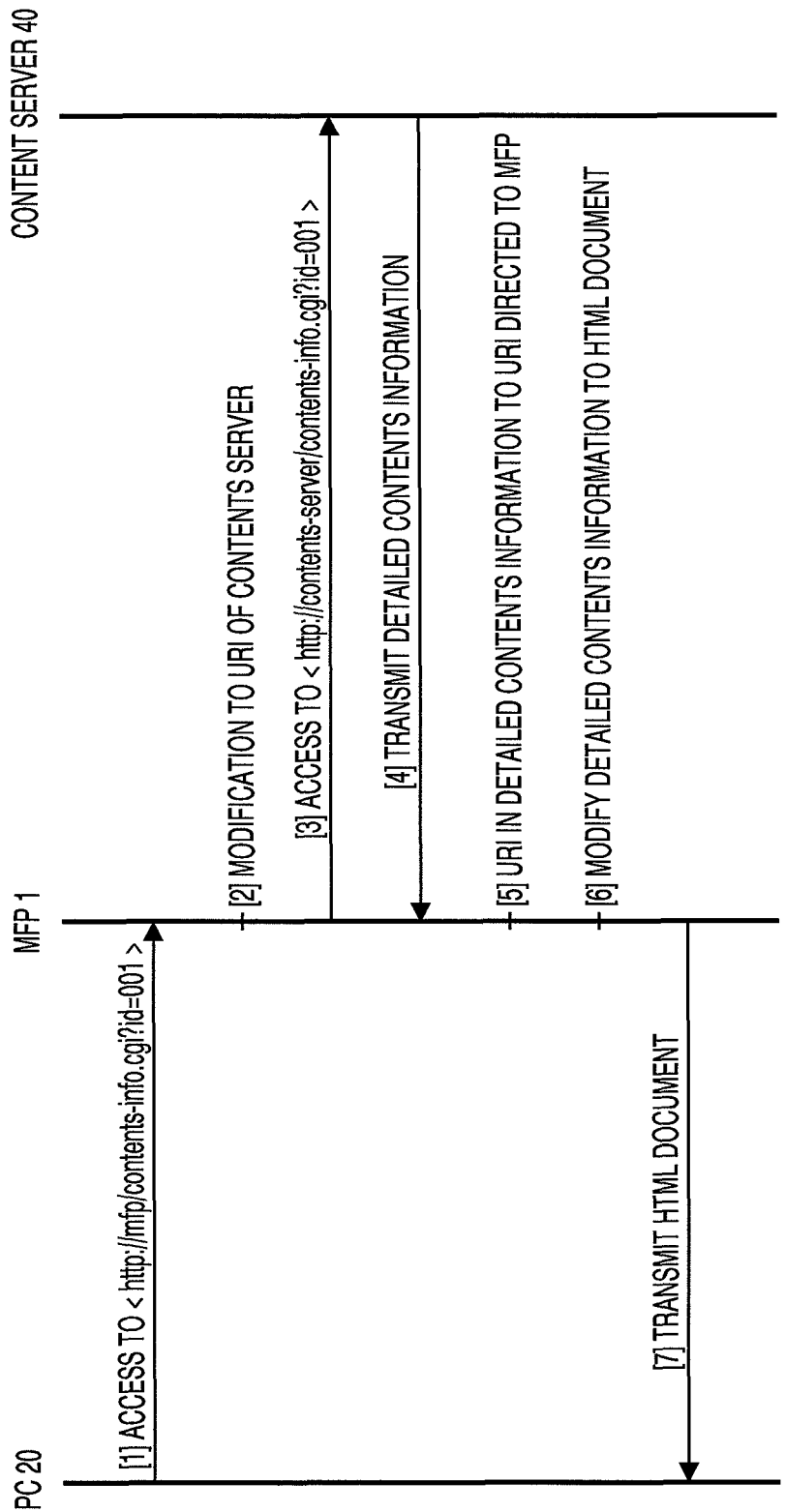

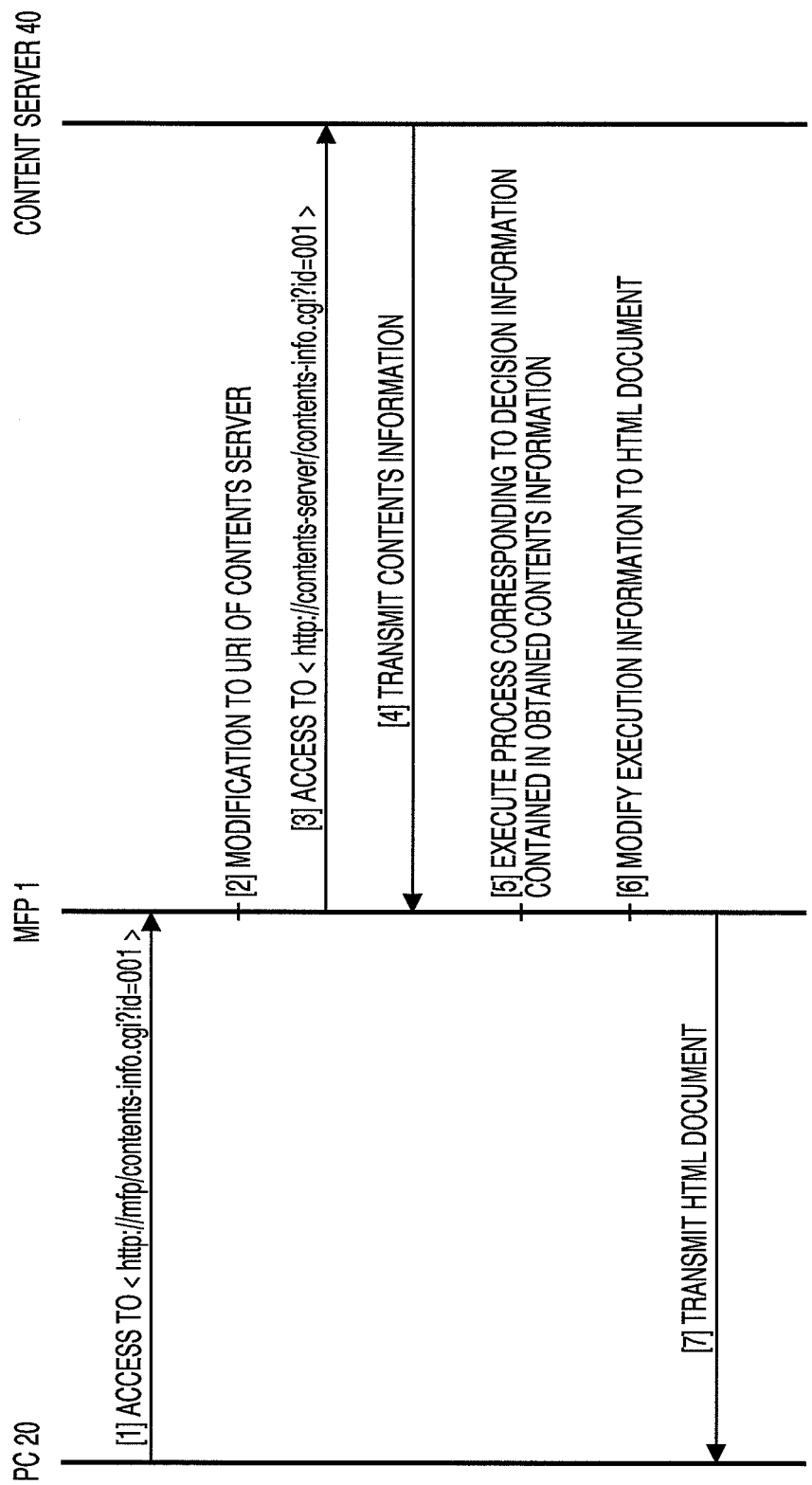

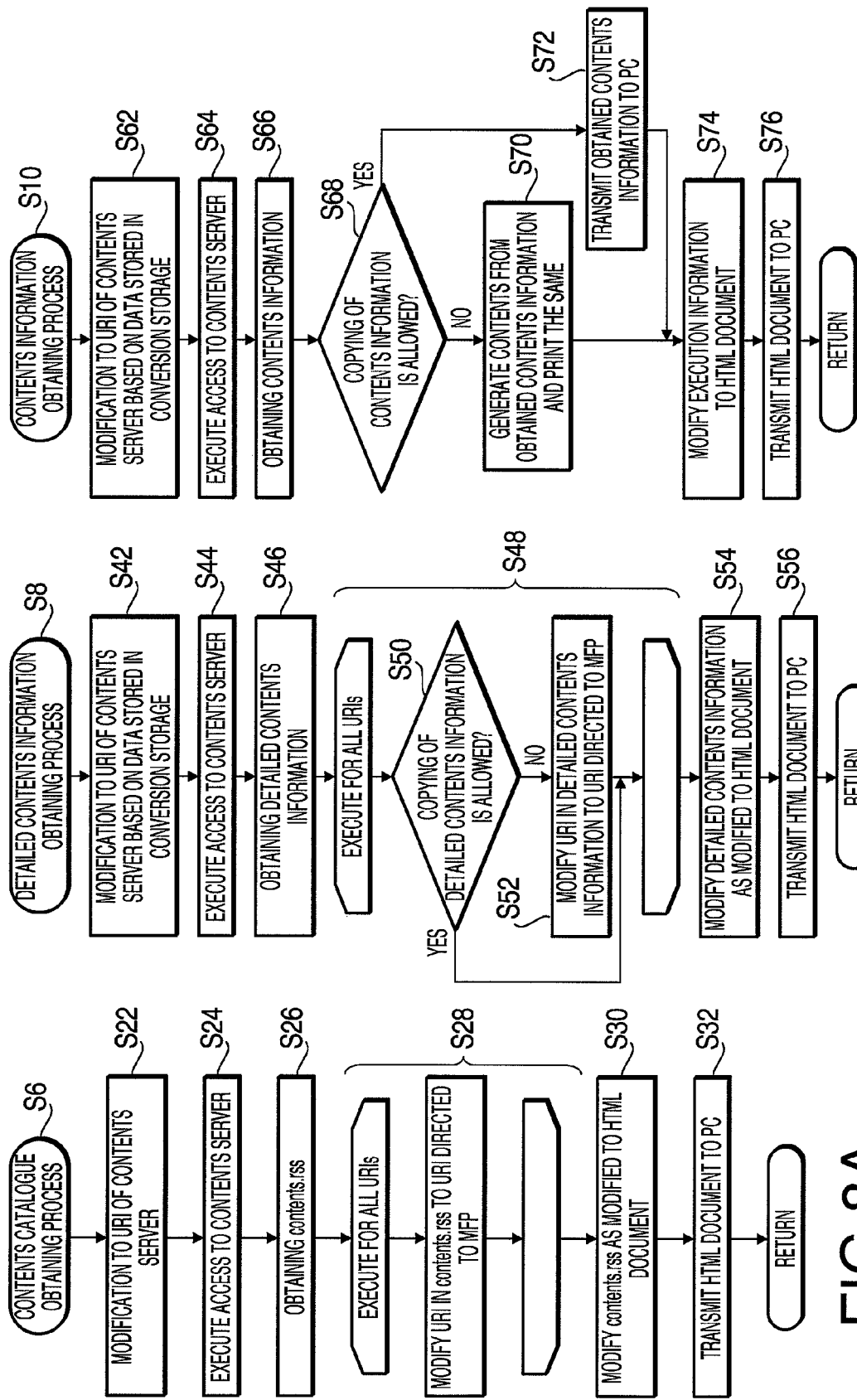

COMMUNICATION DEVICE AND RECORDING MEDIUM STORING PROGRAM THEREFOR

CROSS-REFERENCE TO RELATED APPLICATION

This application claims priority under 35 U.S.C. §119 from Japanese Patent Application No. 2009-080073 filed on Mar. 27, 2009. The entire subject matter of the application is incorporated herein by reference.

BACKGROUND

1. Technical Field

The following descriptions relate to a communication device.

2. Prior Art

Conventionally, there has been known a network print system which is configured such that a PC (personal computer) downloads contents such as image information (image data) from a contents server, and the PC controls a printer to print out the downloaded contents.

SUMMARY OF THE INVENTION

According to the conventional network print system as described above, even if copying of the contents information is not allowed, the contents information can easily be copied once downloaded to the PC.

A communication device according to an embodiment is advantageous in that the unauthorized copying of contents information can be prevented.

According to aspects of the invention, there is provided a communication device having a communication unit configured to communicate with a contents storage which stores contents information and location information representing a storage location of the contents information in associated manner, and to communicate with an external device. The communication device is provided with a location information obtaining unit configured to obtain the location information from the contents storage, through the communication unit, when the communication unit receives a first access from the external device, a modifying unit configured to modify the location information to access information causing an access to the communication device, a storage configured to store the access information and the location information in an associated manner, a transmitting unit configured to transmit the access information to the external device through the communication unit, an identifying unit configured to identify the location information corresponding to the access information that causes the external device to access the communication device based on the information stored in the storage if the access information transmitted by the transmitting unit is selected in the external device and second access to the communication device is made, in response to the selection of the access information, by the external device, through the communication unit, a contents obtaining unit configured to obtain the contents information directed by the location information identified by the identifying unit, through the communication unit, and an execution unit configured to generate the contents based on the contents information obtained with use of the contents obtaining unit, and execute output of the contents.

According to the above configuration, the contents information stored in the contents storage is not obtained by the external communication device. Therefore, the contents information will not be copied by the external communication device.

BRIEF DESCRIPTION OF THE ACCOMPANYING DRAWINGS

FIG. 4 illustrates another example of transmission of data among the PC, MFP and contents server shown in FIG. 1.

FIG. 6 illustrates a further example of transmission of data among the PC, MFP and contents server shown in FIG. 1.

FIG. 8A shows a flowchart illustrating a contents catalogue obtaining process.

FIG. 8B shows a flowchart illustrating a detailed contents information obtaining process.

FIG. 8C shows a flowchart illustrating a contents information obtaining process.

DETAILED DESCRIPTION OF THE EMBODIMENT

Hereinafter, referring to the accompanying drawings, a communication device according to the embodiments will be described in detail. It should be appreciated that the MFP 1 described hereafter, as an exemplary embodiment, can be modified in various ways without departing from the scope of the invention.

Figure 1:
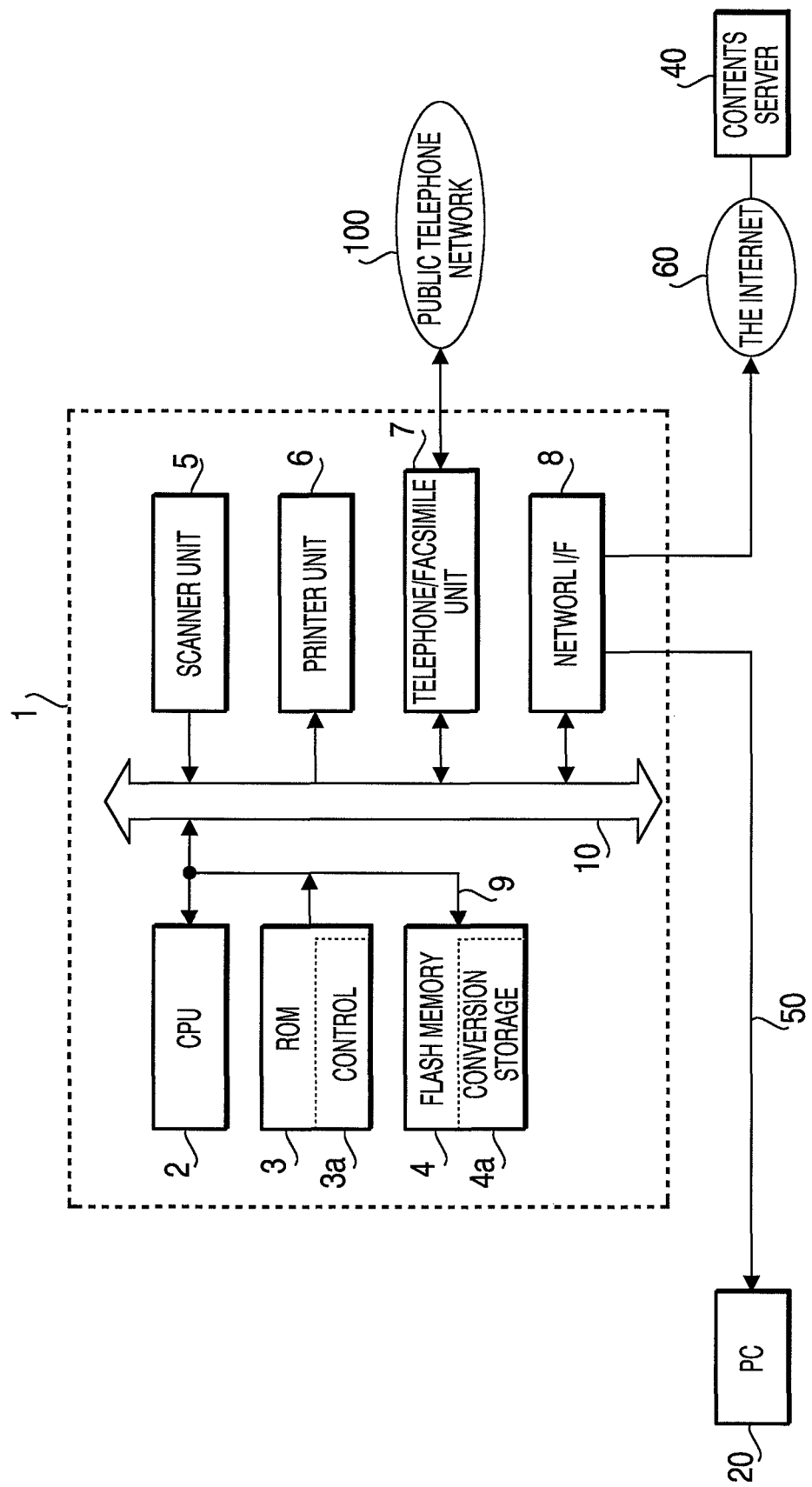
FIG. 1 shows a configuration of a communication system including a PC, an MFP (multi-function peripheral) and a contents server according to embodiment of the invention.

According to an exemplary embodiment, a communication system includes a PC (personal computer) 20, an MFP (multi-function peripheral) 1 and a contents server 40 (see FIG. 1). The PC 20 and the MFP 1 are connected through a LAN (local area network) cable 50 and exchange data therebetween through the LAN cable 50. Further, the MFP 1 is also connected to the contents server 40 through the Internet 60. The contents server 40 and the MFP 1 can also exchange data therebetween through the Internet 60.

Figure 2:
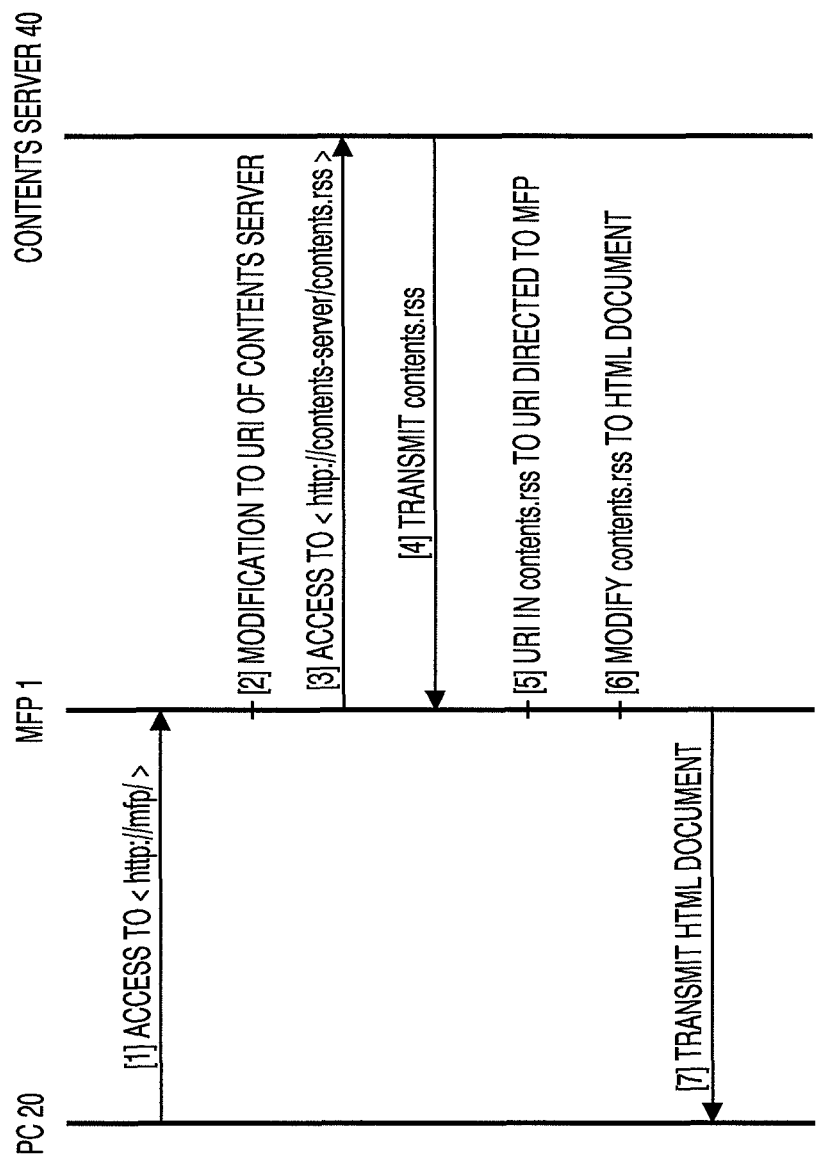
FIG. 2 illustrates an example of transmission of data among the PC, MFP and contents server shown in FIG. 1.

FIG. 2 illustrates a case where the PC 20 obtains URIs (uniform resource identifiers) of the contents information. Specifically, FIG. 2 shows a case where the PC 20 obtains:

(A) contents title information representing a name (title) of contents information stored in the contents server 40;

(B) a URI of the contents information which is used when the contents information stored in the contents server 40 is used; and (C) a URI of detailed contents information used when the detailed contents information stored in the contents server 40 is used.

Hereinafter, a term "contents catalogue" is used, which includes the contents title information, the URI of the contents information and the URI of the detailed contents information.

Further, in the following descriptions, a term "contents information" represents information from which the MFP 1 is capable of generating contents, a term "contents summary information" represents a summary of the contents, and a term "detailed contents information" represents information containing the UIR of the contents information and contents summary information corresponding to the contents information.

The MFP 1 is used as a peripheral device for the PC 20 and has a facsimile function, a printer function and the like (FIG. 1). The MFP 1 includes a CPU (central processing unit) 2, a ROM (read only memory) 3, a flash memory 4, a scanner unit 5, a printer unit 6, a telephone/facsimile unit 7, and a network I/F (interface) 8. The CPU 2, the ROM 3 and the flash memory 4 are interconnected though a bus line 9, which is connected to an I/O (input/output) port 10. The MFP 1 is further provided with an LCD (liquid crystal display), and other components. Since such components are well-known, they are omitted from the drawing for brevity.

The CPU 2 controls each unit connected to the I/O port 10. The ROM 3 is a non-volatile and non-rewritable memory in which a control program 3a and other programs to be executed in the MFP 1 (i.e., by the CPU 2) are stored. Processes illustrated in flowcharts shown in FIGS. 7, 8A-8C are executed as the CPU 2 executes the control program 3a.

The flash memory 4 is a non-volatile and rewritable memory, which stores setting parameters for various setting items, fixed parameters and the like. As shown in FIG. 1, the flash memory 4 includes a conversion storage 4a. According to the embodiment, the MFP 1 is capable of converting a description of URIs (a URI of contents information, and a URI of detailed contents information) that is used for causing the PC 20 to access the contents server 40 to a description of a URI for causing the PC 20 to access the MFP 1. If such a conversion is performed, the conversion storage 4a stores both the descriptions (before and after the conversion) in an associated manner. Further, the flash memory 4 further stores software which enables the MFP 1 to realize a web server function and a web application server function. Thus, the MFP 1 is capable of executing the web server function or the web application server function.

The scanner unit 5, the printer unit 6 and the telephone/facsimile unit 8 are of the well-known configurations, and the description thereof will be omitted for brevity.

As shown in FIG. 1, the network I/F 8 is connected to the LAN cable 50 so that the MFP 1 and the PC 20 are connected, and the network I/F 8 is also connected to the Internet 60 so that the MFP 1 is connected to the contents server 40 through the Internet 60.

The PC 20 serves as an external communication device which is provided outside the MFP 1. In the PC 20, a web browser is preinstalled so that a user of each PC 20 can browse web sites based on URIs.

The contents server 40 is a storage which stores contents title information, contents information, URIs of contents and URIs of detailed contents information in an associated fashion. It should be noted that the information stored in the contents server 40 are described in accordance with a format which can be used by the MFP 1.

Hereinafter, an operation of the MFP 1 when the PC 20 executes a process for obtaining the contents catalogue with use of the URI will be described (see FIG. 2).

When the PC 20 accesses to a URI which is described as <http://mfp/> (see [1] of FIG. 2), the MFP 1 identifies the URI the PC 20 used for accessing the MFP 1, and modifies the identified URI to another URI described as <http://contents-server/contents.rss> ([2] of FIG. 2). Then, the MFP 1 accesses the contents server 40 using the thus modified URI ([3] of FIG. 2), and obtains a contents.rss file which is information of contents catalogue from the contents server 40 ([4] of FIG. 2).

Figure 3A:
FIG. 3A shows an example of contents of a contents.rss file obtained from a contents server.

FIG. 3A shows an exemplary description of the contents.rss file. In the contents.rss file, titles T11 and T21 are described, and links U11b, U12b, U21b and U22b are described. The tiles T11 and T21 describe respective pieces of contents title information. The links U11b and U21b describe URIs of respective pieces of detailed contents information, and the links U12b and U22b describe URIs of respective pieces of contents information.

After obtaining the contents.rss file, the MFP 1 modifies part of URIs in the contents.rss file so that the modified URIs cause the PC 20 to access MFP 1 instead of the contents server 40 ([5] of FIG. 2). Specifically, the MFP 1 modifies a part of each of the links U11b, U12b, U21b and U22b.

Figure 3B:
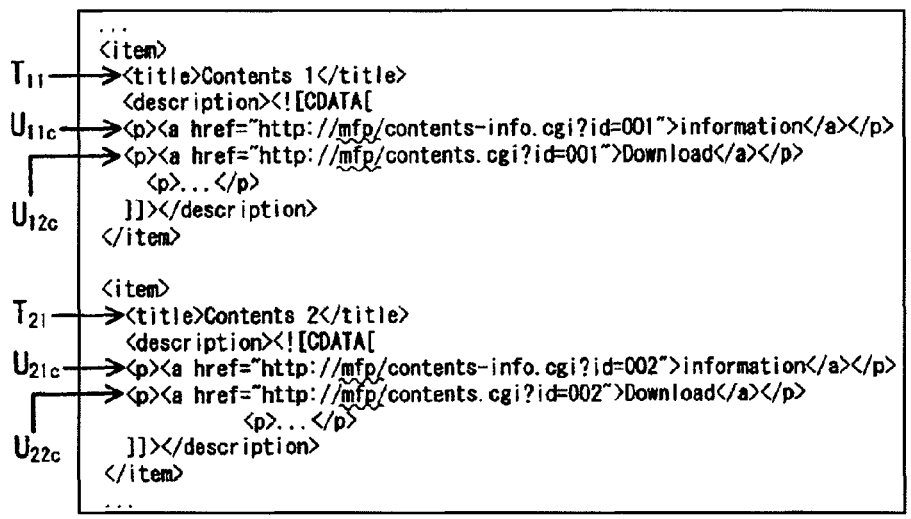
FIG. 3B shows an example of modified contents in which URI in the contents.rss file has been changed.

FIG. 3B shows the modified contents.rss file, in which each of modified links U11c, U12c, U21c and U22c respectively corresponding to the links U11b, U12b, U21b and U22b of FIG. 3A have been modified such that a character string "contents-server," which is written after a character string "http://" and causes an access to the contents server 40 (see FIG. 3A), has been replaced with a character string "mfp" causing an access to the MFP 1 (see FIG. 3B).

After the modification of the contents.rss file as described above, the MFP 1 converts the modified contents.rss file to an html document ([6] of FIG. 2). Then, the MFP 1 transmits the thus generated html document to the PC 20 ([7] of FIG. 2).

Figure 3C:
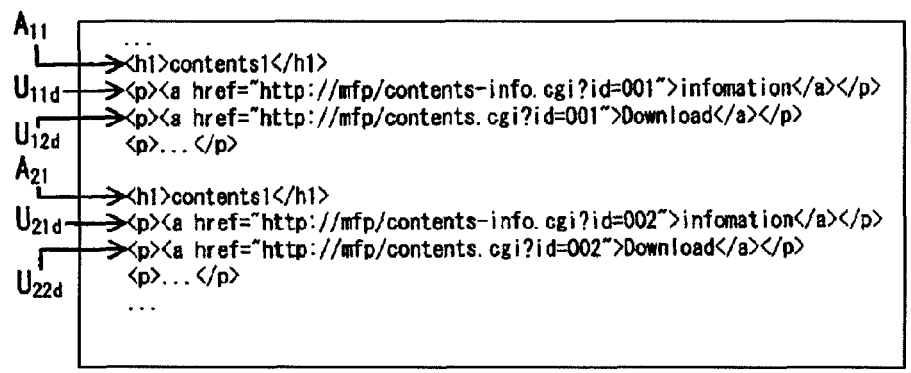
FIG. 3C shows an example of an html document which has been modified from the modified contents shown in FIG. 3B.

FIG. 3C shows an example of description of such an html document. In the html document, titles A11 and A21, and links U11d, U12d, U21d and U22d respectively corresponding to the titles T11 and T21, and the links U11c, U12c, U21c and U22c (see FIG. 3B) are described. When the html document is obtained, the PC 20 executes a displaying operation, using the web browser, in accordance with the description of the html document. With the above configuration, a user of the PC 20 is capable of selecting URIs of the detailed contents information which are displayed using the links U11d and U21d, or the URIs of the contents information which are displayed using the links U12d and U22d, easily, with use of the web browser.

Figure 5A:
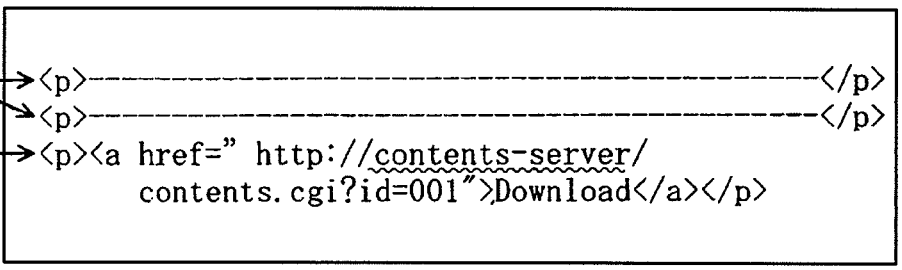
FIG. 5A shows a description of detailed contents information the PC obtained from the contents server.
Figure 5B:
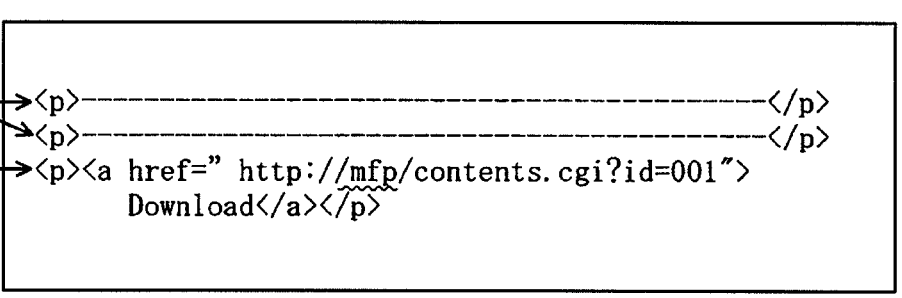
FIG. 5B shows description of modified contents in which part of URI in FIG. 5A has been modified.

Next, an exemplary case where the user of the PC 20 selects the URI of the detailed contents information which is displayed using the link U11d will be described. FIG. 4 shows a communication chart between the PC 20 and the MFP 1, and between the MFP 1 and the contents server 40. FIG. 5A shows a part of a description of the detailed contents information obtained from the contents server 40, and FIG. 5B shows a corresponding part of a description of the detailed contents information in which part of description of the URI has been changed.

In the following description, a case where the URI of the contents summary information, which is displayed on the PC 20 using the link U11d is selected by the user of the PC 20 will be described. However, in another k where the user of the PC 20 directly inputs the URI of the detailed contents information with use of the web browser, the result will be the same.

When the user of the PC 20 selects the URI of the detailed contents information displayed on a display device of the PC 20 with use of the link U11d, as shown in FIG. 4, the PC 20 accesses a URI which is described as <http://mfp/contents-infor.cgi?id=001> (see the link U11d in FIG. 3C, and [1] of FIG. 4). Then, the MFP 1 identifies the URI which the PC 20 uses for accessing the MFP 1, and modifies the URI such that a character string "mfp" is replaced with a character string "contents-server" so that the modified URI causes the access to the contents server 40 ([2] of FIG. 4). Thus, the modified URI reads <http://contents-server/contents-info.cgi?id=001>. Then, the MFP 1 accesses the contents server 40 using the modified URI ([3] of FIG. 4) and obtains the detailed contents information form the contents server 40 ([5] of FIG. 4).

The detailed contents information is described in the html language. As shown in FIG. 5A, the detailed contents information includes a summary Y1 and a link U12b. In the summary Y1, the contents summary information itself is described. In the link U12b, the URI of the contents information corresponding to the contents summary (i.e., one same as the link U12b shown in FIG. 3A) is described.

After obtaining the detailed contents information, the MFP 1 modifies the URI of the detailed contents information to a URI that causes the PC 20 to access the MFP 1. The modified detailed contents information will be described referring to FIG. 5B. As shown in FIG. 5B, in the modified detailed contents information, the summary Y1 has not been changed. For the link U12c, which corresponds to the link U12b, has been changed. That is, a character string "contents-server" after a character string "http://" in the link U12b is replaced with a character string "mfp" which causes the PC 20 to access the MFP 1 instead of the contents server 40. It should be noted that the link U12c in FIG. 5B is identical to the link U12c in FIG. 3B.

After the modification of the URI in the detailed contents information, the MFP 1 modifies the detailed contents information to an html document ([6] of FIG. 4). By the modification to the html document, the link U12c becomes identical to the link U12d in FIG. 3C. Thereafter, the MFP 1 transmits the html document to the PC 20 ([7] of FIG. 4). When received the html document, the PC 20 executes a display operation corresponding to the received html document with use of the web browser. With the above configuration, the user of the PC 20 is capable of browsing the summary Y1, which has been obtained in correspondence with the selection of the link U11d (see FIG. 3C), with use of the web browser. Further, the URI of the contents information (i.e., the link U12d) corresponding to the summary Y1 is selectable with use of the web browser. As above, since the summary Y1 is displayed in correspondence with the URI of the contents information, it becomes possible for the user of the PC 20 to select the URI of desired contents information quickly and easily.

According to the embodiment, in the contents summary information (e.g., the summary Y1) the MFP 1 obtains from the contents server 40, decision information representing whether copying of the contents information corresponding to the summary information is allowed. If the decision information indicates that the contents information can be copied, the MFP 1 does not execute the modification of the URI in the detailed contents information to the URI directed to the MFP 1. That is, the URI of the contents information which is allowed to be copied will not be modified to the URI causing the PC 20 to access the MFP 1, and the MFP 1 modifies the contents information to the html document. Therefore, when the copying of the contents information is allowed, the PC 20 directly accesses the contents server 40 to obtain the contents.

Next, an exemplary case where the user of the PC 20 selects the URI of the contents information which is displayed using the link U12d will be described. FIG. 6 shows a communication chart between the PC 20 and the MFP 1, and between the MFP 1 and the contents server 40.

In the following description, a case where the URI of the contents information, which is displayed on the PC 20 using the link U12d, is selected by the user of the PC 20 will be described. It should be noted that, in another case where the user of the PC 20 directly inputs the URI of the contents information with use of the web browser, the result will be the same.

When the user of the PC 20 selects the URI of the contents information displayed on the PC 20 with use of the link U12d, as shown in FIG. 6, the PC 20 accesses a URI which is described as <http://mfp/contents.cgi?id=001> ([1] of FIG. 6). Then, the MFP 1 identifies the URI used for the access, and modifies the URI such that a character string "mfp" is replaced with a character string "contents-server" so that the modified URI causes the access to the contents server 40 ([2] of FIG. 6).

Thus, the modified URI reads <http://contents-server/contents.cgi?id=001>. Then, the MFP 1 accesses the contents server 40 using the modified URI and obtains the contents information from the contents server 40 ([3] and [4] of FIG. 6). The contents information includes the decision information as in the contents summary information.

Then, the MFP 1 executes an operation in accordance with the decision information included in the obtained contents information. The operation executed by the MFP 1 will be described later with reference to FIG. 8C.

Thereafter, the MFP 1 generates execution information indicating the results of the operation when the URI of the contents information has been selected ([5] of FIG. 6), and modifies the execution information to an html document ([6] of FIG. 6). Then, the MFP 1 transmits the html document to the PC 20 ([7] of FIG. 6). When received the html document, the PC 20 executes a display operation corresponding to the received html document with use of the web browser. With the above configuration, the user of the PC 20 is capable of browsing the execution results when the URI of the contents information is selected with use of the web browser.

Next, communication for obtaining information as shown in FIGS. 2, 4 and 6 will be described referring to flowcharts shown in FIGS. 7 and 8A-8C. The obtaining process shown in FIG. 7 is executed by the CPU 2 of the MFP 1 when the PC 20 accesses the MFP 1 to obtain information.

Figure 7:
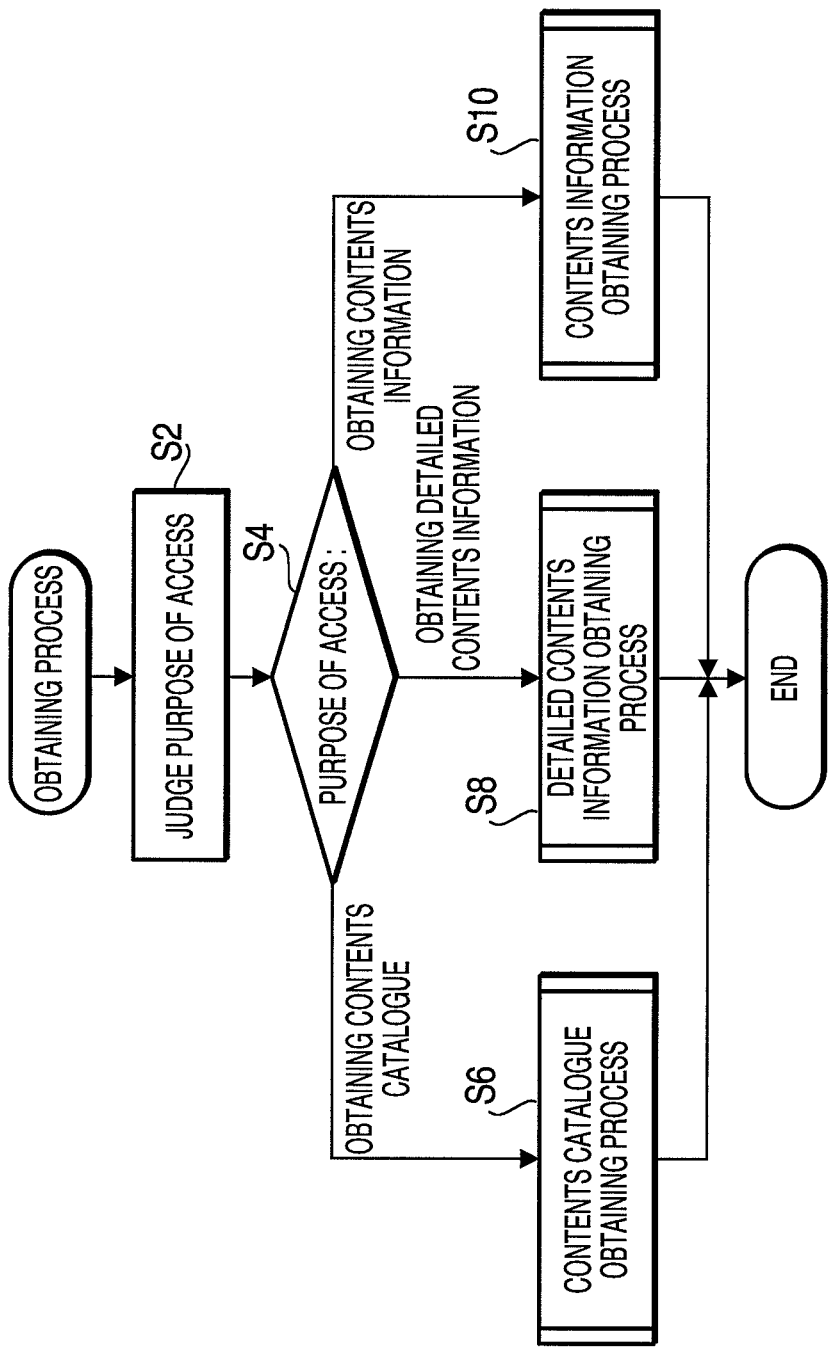
FIG. 7 shows a flowchart illustrating a data obtaining process.

In FIG. 7, the CPU 2 judges a purpose of the access by identifying the URI used for the access (S2). Based on the judgment in S2 (i.e., based on the purpose of access), the process diverges at S4. If the identified URI is <http://mfp/>, the CPU 2 judges that the purpose of access is to obtain the contents catalogue and control proceeds to S6. If the identified URI is <http://mfp/contents-info.cgi . . . >, the CPU 2 judges that the purpose of access is to obtain the detailed contents information and control proceeds to S8. If the identified URI is <http://mfp/contents.cgi . . . >, the CPU 2 judges that the purpose of access is to obtain the contents information and control proceeds to S10.

FIG. 8A shows the contents catalogue obtaining process executed in S6 of the obtaining process shown in FIG. 7. The CPU 2 modifies the URI identified in S2 (FIG. 7) to the URI directed to the contents server 40 (i.e., <http://mfp/contents-server/contents.rss>) in S22. Then, with use of the modified URI, the CPU 2 accesses the contents server 40 (S24). It should be noted that, in S24, the CPU 2 transmits authentication information which has been set to the MFP 1 to the contents server 40.

The contents server 40 judges, based on the authentication information transmitted form the MFP 1, whether the MFP 1 is authorized to access. If the contents server 40 judges that the MFP 1 is the device authorized to access, the contents server 40 transmits the contents.rss file to the MFP 1.

Upon receipt of the contents.rss file (S26), the CPU 2 changes all the URIs in the contents.rss file such that a character string "contents-server" is replace with "mfp" which causes access to the MFP 1 instead of the contents server 40 (S28). It is noted that, in S28, CPU 2 stores the character strings "contents-server" before the modification and the "mfp" after the modification in the conversion storage 4a in an associated fashion.

Thereafter, the CPU 2 modifies the contents.rss file to an html document (S30), transmits the html document to the PC 20 (S32), and terminates the contents catalogue obtaining process.

Since all the URIs in the contents.rss file are rewritten to the URIs causing the access to the MFP 1, the PC 20 is prevented from accessing directly to the contents server 40 to obtain the URIs of the contents information which is not allowed to be copied, and thus the PC 20 is prevented from downloading contents information from the contents server 40.

FIG. 8B shows a flowchart illustrating the detailed contents information obtaining process which is executed in S8 of the obtaining process shown in FIG. 7. The CPU 2 modifies the URI identified in S2 (FIG. 7) to the URI of the contents server 40 referring to the data stored in the conversion storage 4a (S42). Specifically, according to the exemplary embodiment, the conversion storage 4a stores the character strings "contents-server" and "mfp" in associated with each other. Therefore, the CPU 2 replaces the character string "mfp" of the URI identified in S2 (FIG. 7) with the character string "contents-server" directed to the access to the contents server 40 (S42).

For example, a URI <http://mfp/contents-info.cgi?id=001> is converted to a URI <http://contents-server/contents-info.cgi?id=001>. Then, the CPU 2 accesses the contents server 40 (S44). Similarly in S24 of the contents catalogue obtaining process (FIG. 7), the CPU 2 transmits the authentication information to the MFP 1 in S44.

Next, referring to FIG. 8B, the detailed contents information obtaining process (S8 of FIG. 7) will be described. In S42, the CPU 2 modifies the URI, which was identified in S2 of FIG. 7 based on the data stored in the conversion storage 4a, to a URI of the contents server 40. In the conversion storage 4a, character strings "contents-server" and "mfp" are stored in an associated fashion. Based on this data, the CPU 2 replaces the character string "mfp" in the identified URI with the character string "contents-server" which causes an access to the contents server 40. Then, the CPU 2 accesses the contents server 40 using the modified URI (S44). In S44, as in S24 of FIG. 8A, the CPU 2 transmits the preset authentication information to the contents server 40.

When the contents server 40 judges that the MFP 1 from which the access is made is an appropriate (authorized) MFP, the contents server transmits the detailed contents information to the MFP 1. When the MFP 1 receives this contents information (S46), the CPU 2 executes a process of S48 for all the URIs included in the detailed contents information, i.e., for all the URIs included in the contents information. In S50, the CPU 2 judges, for all the URIs included in the contents information, whether contents information corresponding to the contents catalogue information is allowed to be copied, based on the judgment information.

If the copying is not allowed (S50: NO), the CPU 2 modifies, based on the data stored in the conversion storage 4a, the URI of the contents information that is not allowed to be copied to a URI causing the PC 20 to access the MFP 1 instead of the contents server 40 (S52). In the exemplary embodiment, as described above, the conversion storage 4a stores the character strings "contents-server" and "mfp" in an associated manner. Therefore, the CPU 2 changes the character string "contents-server" in the URI of the contents information to a URI causing the PC 20 to access the MFP 1 (e.g., <http://mfp/contents.cgi?id=001>).

If the copying of the contents information is allowed (S50: YES), the CPU 2 skips S52. Thus, the URI of the contents information is not modified to the URL causing the PC 20 to access the MFP 1. Therefore, the PC 20 is capable of the URI which is addressed to the contents server 40 from which the PC 20 is capable of directly downloading the contents information.

After execution of S48, the CPU 2 modifies the detailed contents information to contents to an html document (S54). Then, the CPU 2 transmits the html document to the PC 20 (S58) and terminates the detailed contents obtaining process.

According to the detailed contents obtaining process, the URI of the contents information which is prohibited to be copied is modified to the URI causing the PC 20 to access the MFP 1 instead of the contents server 40. Therefore, the PC 20 does not obtained the contents information which is not allowed to be copied since the PC 20 does not access the contents server 40 directly.

Next, the contents information obtaining process (S10 of FIG. 7) will be described referring to FIG. 8C. The CPU 2 modifies the URI identified in S2 of FIG. 7 to the URI directed to the contents server 40 based on the data stored in the conversion storage 4a (S62). According to the exemplary embodiment, since the character strings character strings "contents-server" and "mfp" are stored in an associated fashion, the CPU 2 replaces the character string "mfp" included in the URI identified in S2 (FIG. 7) with the character string "contents-server" (e.g., <http://contents-server/contens.cgi?id=001>). Since the URI is modified as above, the CPU 2 accesses the contents server 40. It is noted that, similar to S24, the CPU 2 transmits the preset authentication information to the MFP 1 in S64.

When the contents server 40 judges that the access is made by the authorized MFP 1, the contents server 40 transmits the contents information to the MFP 1. When the MFP 1 receives the contents information (S66), the CPU 2 judges whether the contents information is allowed to be copied based on the judgment information contained in the contents information (S68).

When the copying of the contents information is not prohibited (S68: NO), the CPU 2 generates the contents from the received contents information, and prints out the thus generated contents with the printer 9 (S70). If the copying of the contents information is prohibited (S68: YES), the CPU 2 transmits the contents information as obtained to the PC 20 (S72).

After execution of S70 or S72, the CPU 2 generates the execution information and modifies the same to the html document (S74). Then, the CPU 2 transmits the html document to the PC 20 and terminates the print job (S76). It is noted that the execution information represents a massage informing that the contents have been printed when S70 is executed, that the contents information has been transmitted when S72 is executed. After execution of S74, the CPU 2 transmits the html document to the PC 20 (S76), and terminates the contents information obtaining process.

According to the contents information, it is possible to prevent the contents information that is prohibited from being transmitted from the contents server 40 to the PC 20, therefore the contents information is prevented from being copied.

As described above, according to the exemplary embodiment, the contents information is not transmitted to the PC 20 unless the copying of the contents information is permitted. Therefore, copying of the contents information with use of the PC 20 is prevented.

It should be noted that the invention needs not be limited to the configuration of the above-described exemplary embodiment, and various modifications may be available without departing from the scope of the invention.

In the exemplary embodiment, the MFP 1 is explained to obtain one piece of detailed contents information (see FIG. 2). However, such a configuration may be modified such that the MFP 1 is capable of obtain more than one pieces of detailed contents information. For example, if the user of the PC 20 selects the links U11*d* and U21*d* through the web browser, or if the user inputs the links U11*d* and U21*d* directly through the web browser, the MFP 1 may obtain two pieces of detailed contents information corresponding to the selected (inputted) links.

In the exemplary embodiment, the MFP 1 is configured such that, for the contents information which is not allowed to be copied, the contents are printed out. Such a configuration can be modified such that the MFP 1 displays the contents on an LCD instead of printing out the same. In such a modified configuration, the user can recognize the contents without consuming printing sheets.

In S2 of FIG. 7, when the CPU 2 identifies that the URI includes the character string "http://mfc/," the CPU 2 judges that the purpose of the access is to obtain the contents catalogue. Such a configuration can be modified such that the purpose of the access is judged based on a file name the PC 20 is to access. For example, if the MFP 1 receives <http://mfc/contents-list.cgi> of the PC 20, the CPU 2 may judge that the purpose of the access is to obtain the contents catalogue.

Alternatively or optionally, the MFP 1 may be configured to judge the purpose of the access based on the arguments of the identified URI. For example, if the CPU 2 identifies that the URI is <http://mfc/index.cgi?type=list . . . > in S2 of FIG. 7, the CPU 2 determines that the purpose of the access is to obtain the contents catalogue: if the CPU 2 identifies that the URI is <http://mfc/index.cgi?type=info . . . >, the CPU 2 determines that the purpose of the access is to obtain the detailed contents information; and if the CPU 2 identifies that the URI is <http://mfc/index.cgi?type=contents . . . >, the CPU 2 determines that the purpose of the access is to obtain the contents information. In order to modify the exemplary embodiment such that the purpose of the access is determined based on the argument of the URI, the flowcharts shown in FIGS. 8A-8C may be modified as indicated below.

If the purpose is to obtain the contents catalogue, step S22 (FIG. 8A) is omitted and step S24 may be modified so that the access to the contents server 40 is performed using a URI <http://contents-server/contents.rss>.

If the purpose is to obtain the detailed contents information, step S42 (FIG. 8B) is omitted and step S44 may be modified so that the access to the contents server 40 is performed using a URI <http://contents-server/contents-information . . . >.

If the purpose is to obtain the contents information, step S62 (FIG. 8C) is omitted and step S64 may be modified so that the access to the contents server 40 is performed using a URI <http://contents-server/contents.cgi . . . >.

According to the exemplary embodiment, when the contents catalogue is to be transmitted to the PC 20, the MFP 1 modifies the contents.rss file as modified to the html document, and transmits the html document to the PC 20. Such a configuration may be modified such that the contents.rss file is transmitted from the MFP 1 to the PC 20 and the PC 20 modifies the received contents.rss file to the html document. In such a modification, load to the MFP 1 in data processing can be reduced in comparison with a case where the modification is made by the PC 20.

What is claimed is:

1. A communication device having a communication unit configured to communicate with a contents storage which stores contents information that includes decision information indicating whether the contents information is allowed to be copied and location information representing a storage location of the contents information in associated manner, and to communicate with an external device, comprising:
   a location information obtaining unit configured to obtain the location information from the contents storage, through the communication unit, when the communication unit receives a first access from the external device;
   a modifying unit configured to modify the location information to access information causing an access to the communication device;
   a storage configured to store the access information and the location information in an associated manner;
   a transmitting unit configured to transmit the access information to the external device through the communication unit;
   an identifying unit configured to identify the location information corresponding to the access information that causes the external device to access the communication device based on the information stored in the storage if the access information transmitted by the transmitting unit is selected in the external device and second access to the communication device is made, in response to the selection of the access information, by the external device, through the communication unit;
   a contents obtaining unit configured to obtain the contents information directed by the location information identified by the identifying unit, through the communication unit;
   a copy judging unit configured to judge whether the contents information obtained by the contents obtaining unit is allowed to be copied based on the decision information included in the contents information;
   a contents information transmitting unit configured to transmit the contents information to the external device through the communication unit;
   an execution unit configured to generate the contents based on the contents information obtained with use of the contents obtaining unit, and execute output of the contents; and
   a control unit configured to:
      cause the contents information transmitting unit to transmit the contents information to the external device through the communication unit if the copy judging unit judges that the contents information is allowed to be copied,
      prohibit the contents information transmitting unit from transmitting the contents information to the external device through the communication unit if the copy judging unit judges that the contents information is not allowed to be copied, and
      cause the execution unit to generate the contents based on the contents information and execute output of the contents if the copy judging unit judges that the contents information is not allowed to be copied.

2. The communication device according to claim 1, wherein the contents storage is configured to store summary information, which is a summary of the contents, in association with the contents information and the location information,
   wherein the contents obtaining unit is configured such that, when the first access from the external device is made through the communication unit, the obtaining unit obtains the summary information corresponding to the location information from the contents storage, in addition to the location information, and
wherein the transmitting unit is configured to transmit the summary information to the external device through the communication unit in addition to the access information modified by the modifying unit.

3. The communication device according to claim 2,
wherein the summary information includes the decision information indicating whether copying of the contents information is allowed or not,
wherein the copy judging unit is configured to judge whether the contents information obtained by the contents obtaining unit is allowed to be copied based on the decision information included in the summary information, and
wherein the control unit is further configured to cause the modifying unit to stop modifying the location information to the access information and use the obtained location information as the access information if the copy judging unit judges that the contents information is allowed to be copied.

4. The communication device according to claim 1,
wherein the location information includes a first URI indicating a location on the Internet and the access information includes a second URI indicating a location on the network of the communication device,
wherein the obtaining unit is configured to obtain the first URI from the contents storage if the first access from the external device is made through the communication unit,
wherein the modifying unit is configured to modify the first URI obtained by the obtaining unit to the second URI, and
wherein the communication unit is provided with a web browser which allows a user to select the second URI.

5. A non-transitory computer readable recording medium storing a program for a computer having a communication unit configured to communicate with a contents storage which stores contents information that includes decision information indicating whether the contents information is allowed to be copied and location information representing a storage location of the contents information in associated manner, and to communicate with an external device,
the program including computer-executable instructions which, when executed, cause the computer to serve as:
a location information obtaining unit configured to obtain the location information from the contents storage, through the communication unit, when the communication unit receives a first access from the external device;
a modifying unit configured to modify the location information to access information causing an access to the communication device;
a storage configured to store the access information and the location information in an associated manner;
a transmitting unit configured to transmit the access information to the external device through the communication unit;
an identifying unit configured to identify the location information corresponding to the access information that causes the external device to access the communication device based on the information stored in the storage if the access information transmitted by the transmitting unit is selected in the external device and second access to the communication device is made, in response to the selection of the access information, by the external device, through the communication unit;
a contents obtaining unit configured to obtain the contents information directed by the location information identified by the identifying unit, through the communication unit;
a copy judging unit configured to judge whether the contents information obtained by the contents obtaining unit is allowed to be copied based on the decision information included in the contents information;
a contents information transmitting unit configured to transmit the contents information to the external device through the communication unit;
an execution unit configured to generate the contents based on the contents information obtained with use of the contents obtaining unit, and execute output of the contents; and
a control unit configured to:
cause the contents information transmitting unit to transmit the contents information to the external device through the communication unit if the copy judging unit judges that the contents information is allowed to be copied,
prohibit the contents information transmitting unit from transmitting the contents information to the external device through the communication unit if the copy judging unit judges that the contents information is not allowed to be copied, and
cause the execution unit to generate the contents based on the contents information and execute output of the contents if the copy judging unit judges that the contents information is not allowed to be copied.

6. The communication device according to claim 1, wherein the execution unit is configured to execute output of the contents by printing the contents.

7. The communication device according to claim 1, wherein the execution unit is configured to execute output of the contents by displaying the contents on a display of the external device.

* * * * *